2 Sheets—Sheet 1.

FARQUHAR & DOAN.

Evaporating Pan.

No. 2,729.

Reissued Aug. 13, 1867.

Witnesses:

Chas. D. Smith

H. E. M. Bowen

Inventor:

F. Farquhar

R. E. Doan

By Knight Bros

Attorneys

AM. PHOTO-LITHO. CO. N.Y. (OSBORNE'S PROCESS.)

2 Sheets—Sheet 2.

FARQUHAR & DOAN.

Evaporating Pan.

Reissued Aug. 13, 1867.

No. 2,729.

Witnesses:

Chas. L. Smith

H. E. M. Bowen

Inventor:

F. Farquhar

R. C. Doan

By Knight Bros

Attorneys

AM. PHOTO-LITHO. CO. N.Y. (OSBORNE'S PROCESS.)

UNITED STATES PATENT OFFICE.

FRANCIS FARQUHAR AND ROBERT E. DOAN, OF WILMINGTON, OHIO.

IMPROVED SUGAR-EVAPORATOR.

Specification forming part of Letters Patent No. 58,226 dated September 25, 1866; Reissue No. 2,729, dated August 13, 1867.

*To all whom it may concern.*

Be it known that we, FRANCIS FARQUHAR and ROBERT E. DOAN, of Wilmington, in the county of Clinton and State of Ohio, have invented a new and Improved Sugar-Evaporator; and we do hereby declare that the following is a full and exact description thereof, reference being had to the accompanying drawings, making part of this specification—

Figure 1:
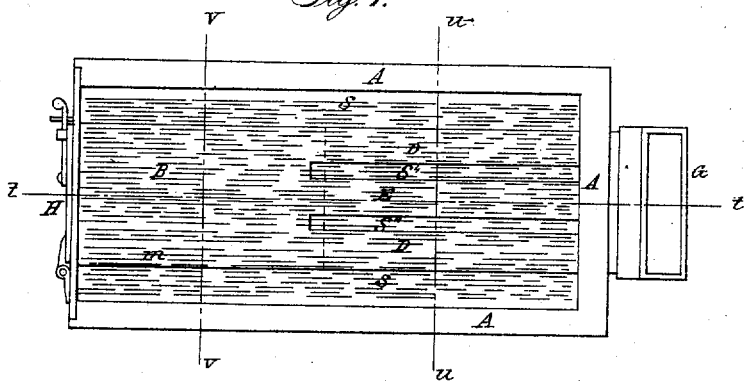
Figure 2:
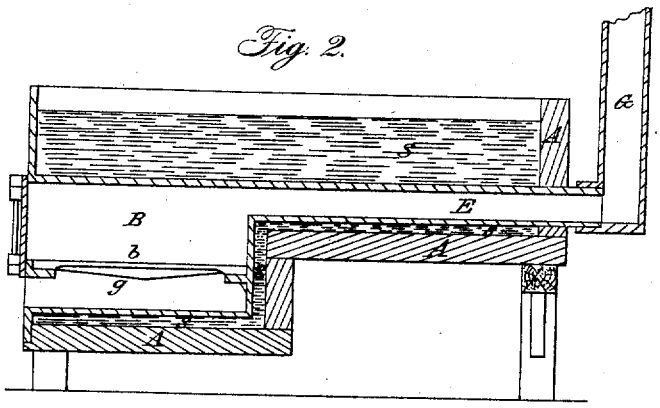
Figure 3:
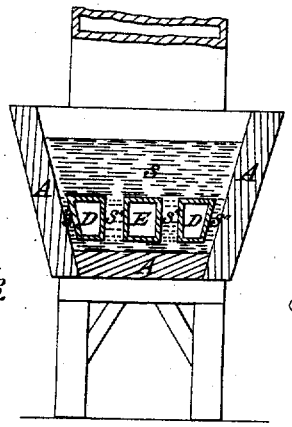
Figure 4:
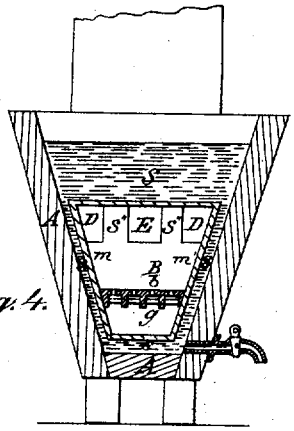
Figure 5:
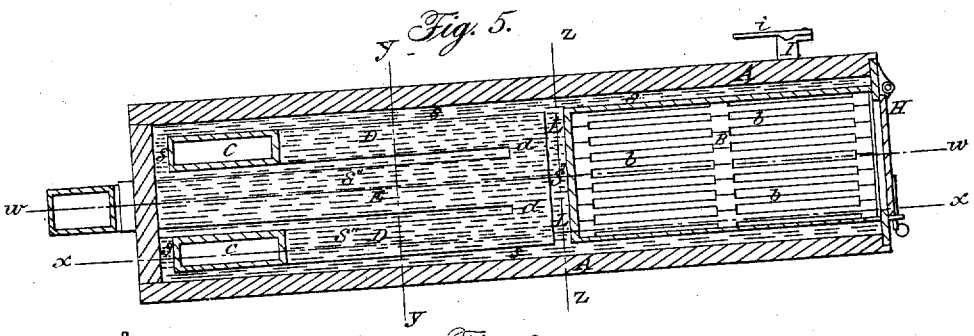
Figure 6:
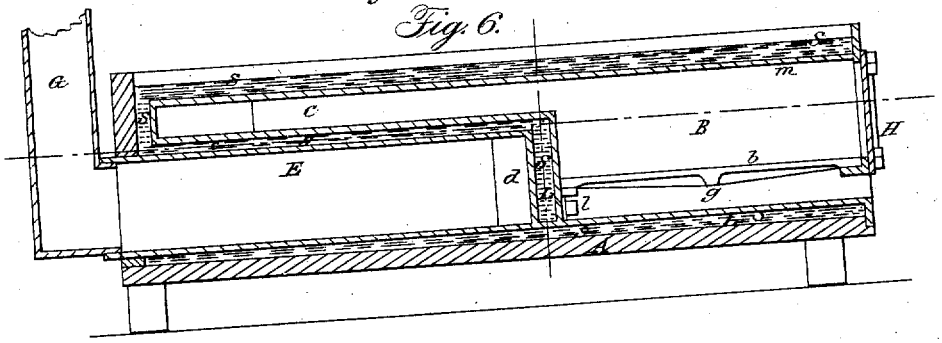
Figure 7:
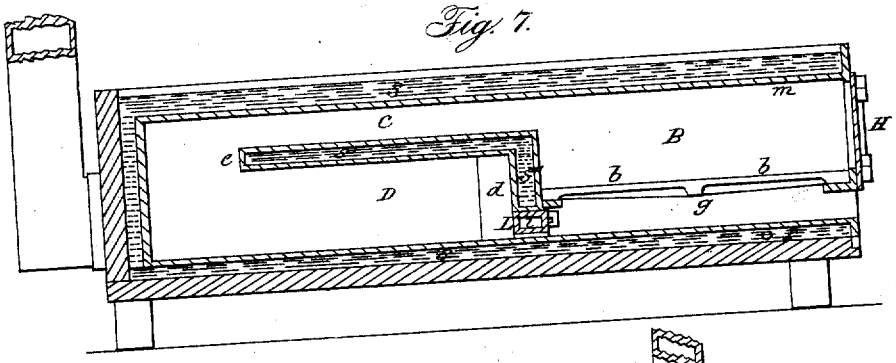
Figure 8:
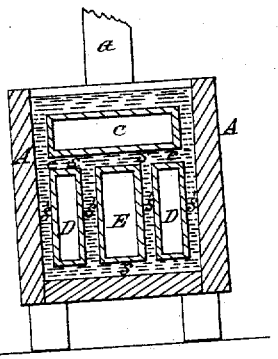
Figure 9:
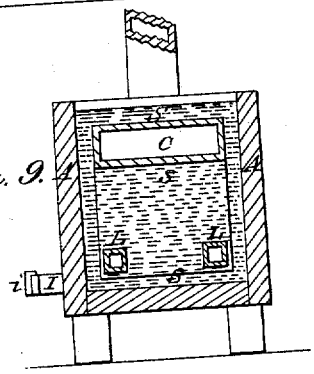

Figure 1 being a top view of a simple direct-flue evaporator constructed in our improved manner. Fig. 2 is a longitudinal vertical section thereof in a plane indicated by the line *t t*, Fig. 1; Figs. 3 and 4, transverse vertical sections thereof in planes respectively indicated by the line *u u* and *v v*, Fig. 1; Fig. 5, a horizontal section (through the upper flue) of a return-flue evaporator constructed in our improved manner; Figs. 6 and 7, longitudinal vertical sections thereof in planes respectively indicated by the lines *w w* and *x x*, Fig. 5; Figs. 8 and 9, transverse vertical sections thereof in planes respectively indicated by the lines *y y* and *z z*, Fig. 5.

Like letters designate corresponding parts in all the figures.

The main feature of our invention consists in surrounding the fire-box and flues with the liquid to be evaporated, so as to get the full effect of the heat from all the radiating-surface of the fire-box and flues whenever practicable.

Another important part of our said invention consists in a peculiar manner of forming the space or spaces in which the liquid to be evaporated is brought into contact with the heated surfaces. In explaining this feature of our invention we will state that the best results can be obtained by applying a given amount of heat uniformly to the smallest practicable quantity of liquid, in order that the heat may be most effectively absorbed or utilized. To this end our invention is to construct the evaporator in such a manner that the adjacent walls of the liquid-containing spaces shall be parallel, or nearly so, thereby confining the liquid of each space in a somewhat thin or attenuated stratum of equal thickness throughout, and adapting the heat to act upon all parts of the same with equal effect. By observing this parallelism in the construction of the fire-box and flues we find that the heat can be much more effectively and economically applied than by making the flues round or employing any other customary construction. We also have specific features of improvement in arrangement and combination, which will be hereinafter specified.

The arrangements for carrying out the leading features of our invention may be various. We herein describe its application, first, with simple direct flues, as shown in Figs. 1, 2, 3, and 4, and also with both direct and return flues, as represented in Figs. 5, 6, 7, 8, and 9. In the first or simplest arrangement of simple direct flues we conveniently employ a wooden box, A, which contains the sorghum-juice or other liquid to be evaporated or heated. The fire-box B, including the ash-pit and draft-chamber *g* and the flues D D and E, are made of sheet-iron or any other metal, and are formed and situated in the box A, so as to be, so to speak, concentric therein, or so as to leave spaces S S S between them and the sides of the box, all around, except at the front end of the fire-box, where access is had thereto through the door H, and where the flues pass out through the rear end of the box, to communicate with the smoke-pipe G. These spaces at the side, rear end, and bottom of the fire-box and flue may be, therefore, of nearly uniform thickness—say one and one-half or two inches—and between the flues there may be about the same width of spaces S″ S″. The flues D D and E being all direct, there may be as many with evaporating-spaces between them as convenient and desirable.

In the more complicated and more efficient arrangement with direct and return flues, as represented in Figs. 5, 6, 7, 8, and 9, the box A, fire-box B, with its ash-pit and draft-chamber *g*, and door H, may be as in the former case, except as to form and dimensions, which are not important; but, instead of two or three direct flues, we first make a broad flue, C, in the top of and the whole width of the flue-case. Thence there are flue-connections *c c* leading directly downward at the rear end and opening into two side return-flues, D D, substantially of the form and proportions shown in the drawings. Thence flue-connections *d d* from both of these return-flues lead inward, near the front end of the flue-work into a single central direct flue, E, which extends straight backward to the smoke-pipe G, and is of sufficient size to conduct all the products of combustion supplied by the return-flues D D. In this case not only are the side, back, and bottom evaporating-spaces, S S S, similar to the arrangement described above for the direct-flue evaporator, but there is a similar space, S′, between the top flue, C, and those beneath, and spaces S″ S″ between the side flues, D D, and central flue, E, and another space, S‴, between the forward end of the said flues D D E and the fire-box B. Thus the evaporating-space is greatly increased. If preferred, the walls of the liquid-containing spaces may slightly diverge from below upward, thus inducing the more ready escape of the steam as well as the ascent of the scum. We also employ, if desirable, direct-flue connections L L between the fire-box B and the flues D D, but they are ordinarily closed by plugs *l l*. They are convenient also for getting access to those flues for cleaning out when occasion may require. The return-flues and their connections with the direct flues also cause the fire-draft to impinge several times in succession directly against the surrounding surfaces, thus more rapidly causing it to part with its heat and to impart it to the liquid to be evaporated. The cold juice is let into the evaporator at the rear end, and, being heavier than the heated juice, first descends to the bottom and thence flows forward in contact with the lower flues, D D E, so as to most completely absorb the heat of the products of combustion before they are discharged. The concentrated sirup is finally drawn off at a spigot, I, with a gate, *i*, near the front end of the box.

What we claim as our invention, and desire to secure by Letters Patent, is—

1. A sugar-evaporator having its fire-box and flues arranged so as to be surrounded with the juice to be evaporated, substantially as and for the purpose herein specified.

2. An evaporating or boiling apparatus having a fire-chamber, flue, or flues whose walls are parallel, or nearly parallel, with the adjacent surfaces, in order that the liquid-containing space or spaces may be adapted for subjecting a given quantity of liquid to the most uniform and effective action of heat, substantially as described.

3. The arrangement of the flues C, D, D, and E, substantially as herein set forth.

4. The evaporating-space S‴ between the flues D D E and the fire-box, as described.

5. The flue-connections L L between the fire-box B and flues D D, for the purpose set set forth.

To the above specification of our improved evaporator we have signed our hands.

FRANCIS FARQUHAR.
ROBERT E. DOAN.

Witnesses as to Francis Farquhar:
OCTAVIUS KNIGHT,
G. D. MORRISON.
Witnesses as to Robert E. Doan:
LEVI MILLS,
JOHN A. SMITH.